Patented Aug. 6, 1946

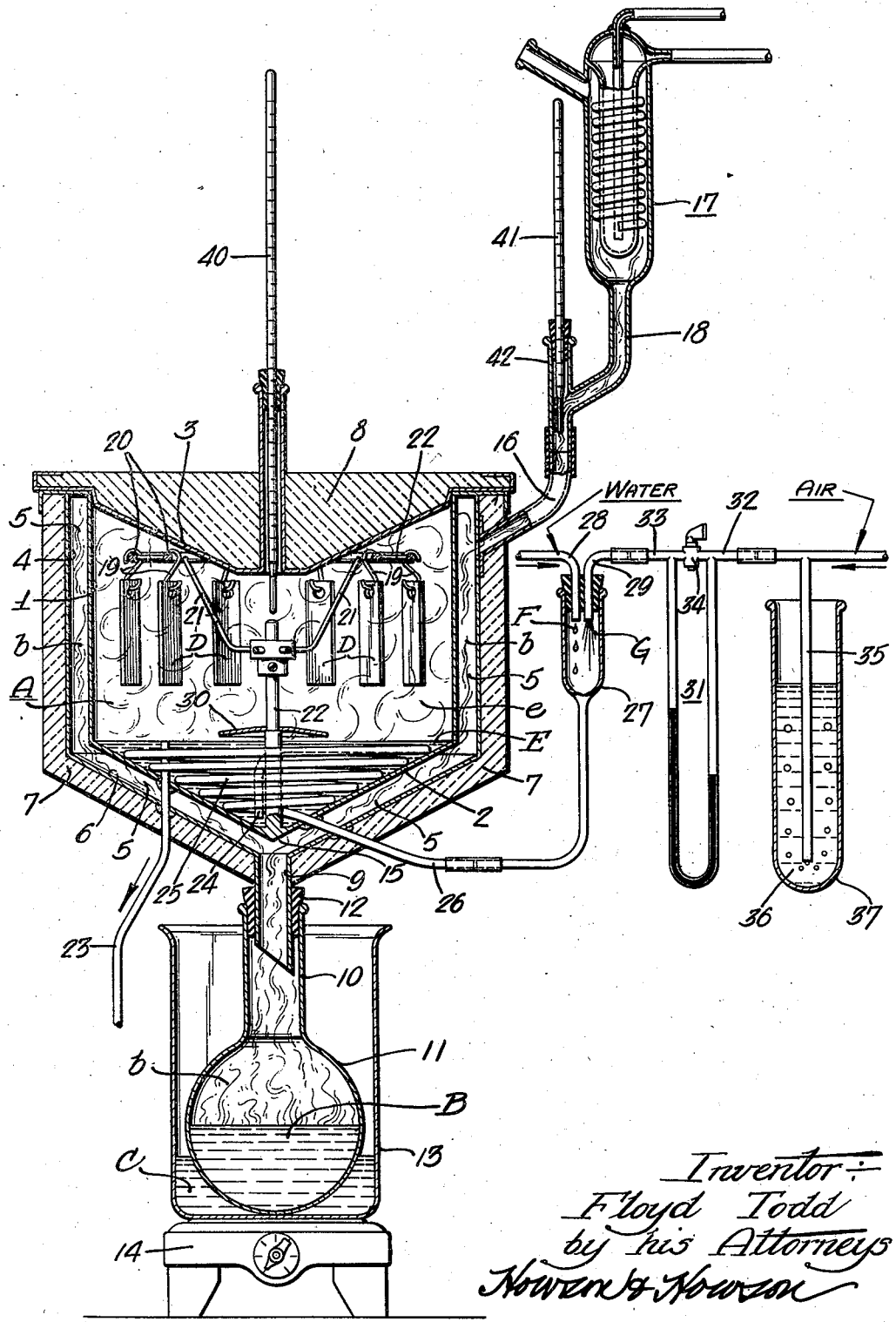

2,405,532

UNITED STATES PATENT OFFICE 2,405,532

CORROSION TESTING APPARATUS

Floyd Todd, Drexel Hill, Pa., assignor to Quaker Chemical Products Corporation, Conshohocken, Pa., a corporation of Pennsylvania Application April 6, 1943, Serial No. 482,006

16 Claims. (Cl. 73—86)

This invention relates to apparatus for conducting corrosion tests on specimens of base metals, metal alloys, metal sheathed or plated specimens, or specimens having various surface finishes purported to have corrosion preventive qualities.

The apparatus of the present invention is adapted for conducting tests on individual specimens separately, or a plurality of specimens of a single kind simultaneously, or a plurality of specimens of different kinds at one time for the purpose of comparison.

The primary object of the invention is to provide means capable of affording reproducible tests, whereby any test made at one time may be accurately reproduced later under identical conditions for comparing specimens prepared at different times and intended to be accurate reproductions one of the other.

Another object of the invention is to provide an apparatus by which corrosion tests on various specimens or lots thereof may be made in rapid succession.

The present invention is directed to the cabinet-type of testing apparatus in which the specimens are subjected to a humidified atmosphere; and one of the objects of the invention is to effect uniform heating of the test chamber of the cabinet in a manner to prevent the creation of convection currents therein, which, heretofore, have been responsible, at least in part, for serious irregularities occurring in corrosion tests conducted in humidity and salt spray cabinets of current constructions.

Prior to the present invention, the aforesaid irregularities have been caused, at least in part, by the specimens being subjected to uneven air exposure, as caused by convection currents being created in the cabinet as a result of the interior of the cabinet being heated from an external source, with the heat applied to but a relatively small portion of the total area of the wall of the test chamber.

Another factor which has contributed to the occurrence of irregularities in corrosion test results heretofore, in humidity and salt spray cabinets, has been the endeavor to maintain a constant uniform temperature within the test chamber by the use of thermostatically controlled regulators. In any thermostatically controlled apparatus, whether of the humidity or salt spray type, the temperature of the interior of the test chamber fluctuates within a range of from one to three degrees, due to lag in the operation of the regulator. These temperature variations are accentuated by the convection currents, previously referred to.

Even when the internal temperature of the test chamber fluctuates within constant limits, the actual corrosion temperature ratio may vary greatly, depending upon the quality of the insulation covering the wall of the test chamber, the temperature of the air surrounding the exterior of the apparatus, and the system or amount of ventilation provided in the room in which the apparatus is being operated.

As a matter of illustration, let it be assumed that variation in the temperature within the cabinet is held within constant limits of 2° with the heat being turned on, for example, when the temperature of the interior of the test chamber drops to 120° F., and turned off when the interior temperature reaches 122° F., with the apparatus being operated in a non-ventilated room having a temperature of 70° F. Under these circumstances, the temperature curve for the interior of the apparatus would take the form of a series of substantially uniform undulations, with the peaks and the low points of the curve spaced apart at rather wide substantially uniform intervals.

Should a window, for example, be opened in the room at a distance of approximately eight feet from the apparatus and the temperature of the room maintained at 70° F., the 2° fluctuation of the temperature within the cabinet would still obtain, while the undulations of the temperature curve would occur at greater frequency, due to a shorter time interval elapsing between the turning on and the turning off of the heat within the cabinet.

If the temperature of the room should be increased, for example, to 92° F., the rather uniform undulations previously mentioned would disappear, and the temperature curve would then assume the form of a saw-tooth plotting, with the upward slopes, during the times in which the heat would be turned on, being disposed at a relatively steep angle to the horizontal, and with the downward slopes, developed while the heat is turned off, assuming a considerably lesser angle with respect to the horizontal.

On the upward slopes of the temperature graph, the air in the cabinet is not completely saturated with moisture, whereas, on the downward slopes of the graph, the air becomes supersaturated, frequently resulting in condensation occurring within the cabinet. This condensation is irregular and emphasizes any slight surface irregularities which may be present in the samples or specimens undergoing test. Moreover, the conditions existing under such a cycle of operation profoundly affect the corrosion behavior, and lead to appreciable discrepancy in corrosion time and type, depending, to a great extent, on factors externally of the cabinet which are not readily controllable.

In salt spray cabinets, the spray particle size is a variable which is exceedingly difficult to control, as it is influenced by relatively slight fluctuations in the air pressure, temperature of the salt solution, and angle of impact. Thus, corrosion tests conducted in salt spray cabinets are exceedingly erratic.

In accordance with the present invention, the walls defining the test chamber are heated over a preponderant portion of the total area thereof, by vapors derived from a liquid having a constant boiling temperature, by which the interior of the test chamber, throughout its entirety, is maintained at a constant uniform temperature and complete elimination of convection currents within the test chamber is accomplished.

As fluctuations in the temperature of the interior of the test chamber are eliminated, the temperature graph assumes the form of a straight line, and all semblances of recurrent cycles of sub and super saturation of air within the test chamber disappear.

As a result of the accomplishment of the aforesaid improved conditions, extreme uniformity in the results of the corrosion tests conducted within the chamber is effected. Corrosion, under the improved conditions, takes place over the entire surface of the specimen, instead of in spots, as has been customary in prior art devices.

In view of the extreme uniformity of results obtained by the use of the apparatus of the present invention, specimens of considerably smaller size, for example specimens of about one-sixth the size of the panels usually employed, may be used, with a consequent saving in material, space, time, and maintenance.

Another result accruing to the use of the apparatus of the present invention is that corrosion on the specimens may be more readily and more accurately observed.

For the purposes of the present invention, a constant boiling liquid, such as a cyclopentane, is preferably employed to produce a vapor externally applied to the walls of the test chamber throughout the greater portion of the total area thereof, for uniformly heating all parts of the interior of the chamber. This liquid has a constant boiling temperature of 121° F., which temperature is most commonly used in making corrosion tests.

When a still more highly accelerated test is desired, a liquid is employed for the external heating of the test chamber of the cabinet which has a boiling point higher than that of cyclopane, such, for example, as acetone which has a boiling point of 133° F., benzol having a boiling point of 176° F., or water which has a boiling point of 212° F. Tests conducted at such higher temperatures are more accelerated and are far more reproducible than could possibly be accomplished by use of a salt spray method.

For producing the desired humified atmosphere within the interior of the test chamber of the cabinet, the use of water, preheated to the temperature at which a test is to be conducted, is preferred.

The single figure of the accompanying drawing illustrates, more or less diagramatically, a vertical sectional elevation of an apparatus suitable for use in conducting corrosion tests in accordance with the principles of the present invention.

As shown in the drawing, a jacketed test chamber A, in the present instance, is defined by an inner cylindrical side wall 1, an inner inverted conical bottom wall 2, and a correspondingly shaped top wall 3.

Concentric with, and spaced radially from the inner cylindrical wall 1 of the chamber A, is an exterior cylindrical wall 4 by which a suitable annular space 5, within the double wall 1—4, is provided around the test chamber A.

Similarly, an exterior wall 6 is disposed substantially parallel to and spaced from the bottom wall 2 of the chamber A, to provide a continuation of the space 5 beneath the entire area of the inner bottom wall 2 of the test chamber A.

Outside the exterior walls 4 and 6, the apparatus is provided with a layer of heat insulating material 7, which may be of any desired kind and thickness to prevent loss of heat from the apparatus, by radiation from the walls 4 and 6, and to shield said walls from the influences of any drafts or other atmospheric conditions existing in the room in which the apparatus is being operated. For similar reasons, the top wall 3 of the test chamber A is provided with a suitable layer of insulating material 8.

In axial alignment with the test chamber A, the external bottom wall 6 of the apparatus is provided with a depending tubular extension 9, which projects downwardly into an upstanding neck 10 of a flask 11, in which the constant boiling liquid B is contained, said tubular extension 9 passing through a suitable stopper 12 installed in the open end of the neck 10 around the tubular extension 9, for sealing purposes.

In the present instance, the lower portion of the flask 11 is submerged in a body of the heating liquid C, such, for example, as a suitable oil. The heating liquid C is contained in a receptacle 13, which is sufficiently deep to embrace substantially the full length of the flask 11 and neck 10 thereof.

Any suitable means, such as an electric unit 14, may be employed for heating the receptacle 13 and the body of oil C therein, to effect heating of the constant boiling liquid B in the flask 11 to the temperature at which said liquid boils and emits a vapor b.

The vapor b, as shown in the drawing, passes upwardly through the neck 10 of the flask 11 and into the tubular extension 9 of the apparatus. From the inlet 9, the vapor b passes into the space 5, directly below the inverted apex 15 of the conical inner bottom wall 2 of the chamber A. The conical bottom wall 2 effects a spreading of the vapor b, throughout the lower portion of the space 5, over the entire area of said bottom, from which the vapor passes into the upper portion of the space 5, completely surrounding the inner cylindrical side wall 1 of the test chamber A.

Surplus vapor may pass from the space 5 encircling the chamber A, through a suitable pipe 16, into a suitable condenser 17, for example, one commonly known as the Friedrich condenser, in which the flow of vapor is retarded and condensation effected, said condensation trickling back through the pipe 18 into the pipe 16, and from the pipe 16 back into the space 5, from which it returns to the flask 11.

Test samples, in the form of panels or plates D are adapted to be suspended, in a vertical position within the chamber A, by means of S-hoops 19. The hooks 19 are adapted to be suspended from a pair of concentric rings 20. The inner ring 20 is supported by a bracket 21 mounted on a central stem 22 which is axially aligned with the chamber A and supported, in any suitable manner, on and by the bottom wall 2 thereof. The outer ring 20 is connected by suitable radial rods 22, to the inner ring 20, at spaced intervals around the circumference thereof.

A corrosion-producing atmosphere e is produced and maintained within the chamber A, around the specimens D supported therein, above a body of liquid E which is maintained in the bottom conical portion of said chamber, at a constant uniform level, by means of an overflow pipe 23.

The humid atmosphere e and the underlying body of liquid E are maintained in the chamber A by constant entrance into said chamber of a predetermined mixture of liquid and gaseous fluids, such as water F and air G.

The liquid and gaseous fluids are mixed intimately and preheated to the temperature being maintained within the chamber A of the cabinet, before being admitted thereto. This is accomplished by suitable mixing and preheating means, which, in the particular embodiment herein described by way of example, is an inverted conical coil 25, immersed in the body of water E which is maintained in the bottom portion of the chamber A, as described.

If desired, the preheating and mixing of the liquid and gaseous fluids employed for producing the desired atmosphere in the chamber A, above the liquid E, may be effected in a different manner from that described above, for example, in and by use of a separate unit disposed outside the cabinet, but the arrangement herein shown and described is preferred as being the more simple and compact.

The mixture F—G is emitted from a downwardly turned end 24 of an upper convolution of an inverted conical coil 25 which is located in the bottom of the chamber A and submerged within the body of liquid E therein. The lower end 26 of the conical coil 25 is connected to a suitable mixer 27, into which the liquid fluid F, such as water, enters through a pipe 28, at a suitable rate, such, for example, as sixty drops per minute. The gaseous fluid G, such as air, is admitted into the mixer 27 through a pipe 29, at a predetermined rate, for example two cubic feet per minute.

The air and water combined in the mixer 27 pass upwardly and spirally through the coil 25, and then take an abrupt course downwardly from the upper end of the coil and discharge from the lower end 24 of the coil, into the body of liquid E.

The moisture laden air rises through the body of liquid E and forms an atmosphere e, of substantially 100% relative humidity within the chamber A above the liquid E and surrounding each of the specimens D.

A baffle 30 is supported by the post 22, and is arranged above the outlet end 24 of the coil 25, to trap and destroy any water containing bubbles or spray which may tend to rise in the atmosphere e around the specimen panels D.

The volume of air entering the mixer 27 through the pipe 29 is maintained constant by a suitable flow meter 31, into the inlet end 32 of which air is admitted at the rate of, for example, three cubic feet per minute. The air passes through a suitable orifice calibrated to pass the air through to the end 33 thereof at the rate of two cubic feet per minute. The calibrated orifice may be disposed in the pipe 32—33 itself or in the plug of a suitable valve 34 inserted in the line.

Excess air backing up in the inlet pipe 32 passes into a down pipe 35 having a lower open end submerged in a body of liquid 36, such as mineral oil having a viscosity of 100 at 100° F., which is contained in an open vessel 37 by which excess air is permitted to escape. In this manner, the air pressure at 33 is always maintained constant and equal to the pressure of the atmosphere plus the head pressure of the body of oil 36 in the vessel 37, at the discharge end of the down pipe 35 submerged in said body of oil. By maintaining this air pressure constant and independent of any variations in the main supply pipes, the need for readjustments to maintain a constant rate of flow are practically eliminated.

The liquid E in the bottom of the chamber A is heated by the vapor b in the jacket 5 surrounding said chamber. The liquid E, in turn, heats the coil 25 submerged therein and the mixture of air and water entering the lower end of the coil 25, through pipe 26, as it passes spirally and upwardly through said coil, is preheated and humidified at the temperature obtained within the chamber A by heating the side and bottom walls thereof with the vapor of the constant boiling liquid B generated in the flask 11.

The temperature of the atmosphere e in the chamber A may be readily checked by reading of the thermometer 40 which projects upward through the removable cover or top wall 3—8 of the chamber A; and the temperature of the heating vapor b may be readily checked by reading of the thermometer 41 arranged in an extension 42 of the excess vapor pipe 16, prior to the excess vapor entering the condenser 17.

The inverted conical nature of the top wall 3 serves to collect any condensation that may develop in the chamber A and causes it to travel toward the vertical center of the chamber, inside the circle of specimens supported by the inner ring 20, thus preventing the condensation from dropping onto the specimens.

I claim:

1. A corrosion testing apparatus, comprising a closed walled test chamber, means for freely suspending test specimens in said chamber, means in the form of a shell spaced from and completely surrounding a major portion of the exterior of said walled chamber and adapted to retain a vaporized heating medium in contact with said major portion of said chamber, an insulated removable cover enclosing the remaining portion of said chamber, means for supplying said medium to the space between said walled chamber and said shell for heating the walls of said chamber uniformly to a predetermined temperature, and means for supplying a corrosion-producing medium to the interior of said chamber for contact with and complete external envelopment of the test specimens arranged therein.

2. A corrosion testing apparatus, comprising a closed test chamber provided with double relatively spaced walls, means connected to the lower portion of the space between said walls for supplying a vaporized heating medium to the space between the double walls of said chamber for heating the innermost of said walls uniformly to a predetermined temperature, condensing means connected to the upper portion of the space between said walls in a manner permitting vapor condensate to return to said supplying means through said space, and means for supplying a corrosion-producing medium to the interior of said chamber for contact with test specimens arranged therein.

3. A corrosion testing apparatus, comprising a closed test chamber provided with double relatively spaced walls, means connected to the lower portion of the space between said walls for supplying a vaporized heating medium derived from a constant boiling liquid to the space between the double walls of said chamber for heating the innermost of said walls uniformly to a predetermined temperature, condensing means connected to the upper portion of the space between said walls in a manner permitting vapor condensate to return to said supplying means through said space, and means for supplying a corrosion-producing medium to the interior of said chamber for contact with test specimens arranged therein.

4. A corrosion testing apparatus, comprising a closed test chamber provided with double relatively spaced walls, means connected to the lower portion of the space between said walls for supplying a vaporized heating medium derived from a constant boiling liquid to the space between the double walls of said chamber for heating the innermost of said walls uniformly to a predetermined temperature, condensing means connected to the upper portion of the space between said walls in a manner permitting vapor condensate to return to said supplying means through said space, means for heating said liquid to boiling temperature to produce said heating vapor, and means for supplying a corrosion-producing medium to the interior of said chamber for contact with test specimens arranged therein.

5. A corrosion testing apparatus, comprising a closed test chamber provided with double relatively spaced walls, means connected to the lower portion of the space between said walls for supplying a vaporized heating medium derived from a constant boiling liquid to the space between the double walls of said chamber for heating the innermost of said walls uniformly to a predetermined temperature, means for heating said liquid to boiling temperature to produce said heating vapor, means externally of said chamber for condensing excess vapor conducted away from said space and connected to said chamber in a manner permitting return of vapor condensate to said supplying means through said space, and means for supplying a corrosion-producing medium to the interior of said chamber for contact with test specimens arranged therein.

6. A corrosion testing apparatus, comprising a closed test chamber provided with double relatively spaced walls, means connected to the lower portion of the space between said walls for supplying a vaporized heating medium derived from a constant boiling liquid to the space between the double walls of said chamber for heating the innermost of said walls uniformly to a predetermined temperature, means for heating said liquid to boiling temperature to produce said heating vapor, insulating means enclosing said doubled walled chamber to exclude extraneous atmosphere from contact with the outermost wall thereof, and means for supplying a corrosion-producing medium to the interior of said chamber for contact with test specimens arranged therein.

7. A corrosion testing apparatus, comprising a closed walled test chamber, means for freely suspending test specimens in said chamber, means in the form of a shell spaced from and completely surrounding a major portion of the exterior of said walled chamber and adapted to retain a vaporized heating medium in contact with said major portion of said chamber, an insulated removable cover enclosing the remaining portion of said chamber, means for supplying said medium to the space between said walled chamber and said shell for heating the walls of said chamber uniformly to a predetermined temperature, and means including a gas and liquid mixing device for supplying a gaseous corrosion-producing medium to the interior of said chamber for contact with and complete external envelopment of the test specimens arranged therein.

8. A corrosion testing apparatus, comprising a closed walled test chamber, means in the form of a shell spaced from and completely surrounding a major portion of the exterior of said walled chamber and adapted to retain a vaporized heating medium in contact with said major portion of said chamber, an insulated removable cover enclosing the remaining portion of said chamber, means for supplying said medium to the space between said walled chamber and said shell for heating the walls of said chamber uniformly to a predetermined temperature, and metering means including a gas and liquid mixing device and means affording a water-sealed escapement port for excessive gas pressure for supplying a gaseous corrosion-producing medium to the interior of said chamber at a predetermined rate for contact with test specimens arranged therein.

9. A corrosion testing apparatus, comprising a closed walled test chamber, means for heating the walls of said chamber uniformly to a predetermined temperature, and means for supplying a gaseous corrosion-producing medium to the interior of said chamber for contact with test specimens arranged therein, including means for mixing predetermined quantities of liquid and gaseous fluids together preparatory to entering said chamber.

10. A corrosion testing apparatus, comprising a closed walled test chamber, means for heating the walls of said chamber uniformly to a predetermined temperature, means for supplying a gaseous corrosion-producing medium to the interior of said chamber for contact with test specimens arranged therein including a mixer, means for supplying a liquid constituent of said medium to said mixer, means for supplying a gaseous constituent of said medium to said mixer, and means for metering the flow of said gaseous constituent to said mixer.

11. A corrosion testing apparatus, comprising a closed walled test chamber, means for heating the walls of said chamber uniformly to a predetermined temperature, means for supplying a gaseous corrosion-producing medium to the interior of said chamber for contact with test specimens arranged therein including a mixer, means for supplying a liquid constituent of said medium to said mixer, means for supplying a gaseous constituent of said medium to said mixer, means for metering the flow of said gaseous constituent to said mixer, and means affording escape of excess gaseous constituent from the supplying means for said gaseous constituent.

12. A corrosion testing apparatus, comprising a test chamber provided with double relatively spaced walls, means connected to the lower portion of the space between said walls for supplying a vaporized heating medium to the space between the double walls of said chamber for heating the innermost of said walls uniformly to a predetermined temperature comprising a receptacle below said chamber, a constant boiling liquid in said receptacle, means for heating said liquid to boiling temperature to create said vaporized medium, condensing means connected to the upper portion of the space between said walls in a manner permitting vapor condensate to return to said supplying means through said space, and means for supplying a corrosion-producing medium to the interior of said chamber for contact with test specimens arranged therein.

13. A corrosion testing apparatus, comprising a closed walled test chamber, means for heating the walls of said chamber uniformly to a predetermined temperature, means for supplying a gaseous corrosion-producing medium to the interior of said chamber for contact with test specimens arranged therein, and means providing a circuitous path for said medium within said chamber for bringing said gaseous medium to the temperature created within said chamber by said heating of said walls before discharge of said gaseous medium into said chamber.

14. A corrosion testing apparatus, comprising a closed walled test chamber, means for heating the walls of said chamber uniformly to a predetermined temperature, means for supplying a gaseous corrosion-producing medium to the interior of said chamber for contact with test specimens arranged therein, and means for bringing said gaseous medium to the humidity and temperature prevailing in said chamber prior to discharge of said medium thereinto.

15. A corrosion testing apparatus, comprising a closed test chamber including an inverted conical bottom wall affording a correspondingly shaped space in the bottom of said chamber, a body of liquid in said space, means for heating the walls of said chamber uniformly to a predetermined temperature and said body of liquid, and means for supplying a gaseous corrosion-producing medium to the interior of said chamber for contact with test specimens arranged therein, including a coil of tubing submerged in said liquid with an outlet end of the tube disposed adjacent the inverted apex of said conical bottom wall to effect humidification of the gaseous medium emitted from said discharge end and rising through said liquid into the interior of said chamber above said liquid.

16. A corrosion testing apparatus, comprising a closed test chamber including an inverted conical bottom wall affording a correspondingly shaped space in the bottom of said chamber, a body of liquid in said space, means for heating the walls of said chamber uniformly to a predetermined temperature and said body of liquid, means for supplying a gaseous corrosion-producing medium to the interior of said chamber for contact with test specimens arranged therein, including a coil of tubing submerged in said liquid with an outlet end of the tube disposed adjacent the inverted apex of said conical bottom wall to effect humidification of the gaseous medium emitted from said discharge end and rising through said liquid into the interior of said chamber above said liquid, and a baffle superposed above said liquid and the discharge end of said tube to disperse any liquid carried by said rising medium.

FLOYD TODD.